(12) United States Patent
Makki et al.

(10) Patent No.: US 11,831,440 B2
(45) Date of Patent: Nov. 28, 2023

(54) RELAYING IN A WIRELESS COMMUNICATION NETWORK

(71) Applicant: Telefonaktiebolaget LM Ericsson (publ), Stockholm (SE)

(72) Inventors: Behrooz Makki, Pixbo (SE); Mikael Coldrey, Borås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/623,149

(22) PCT Filed: Jul. 1, 2019

(86) PCT No.: PCT/SE2019/050650
§ 371 (c)(1),
(2) Date: Dec. 27, 2021

(87) PCT Pub. No.: WO2021/002785
PCT Pub. Date: Jan. 7, 2021

(65) Prior Publication Data
US 2022/0255676 A1 Aug. 11, 2022

(51) Int. Cl.
*H04L 1/1812* (2023.01)
*H04L 1/00* (2006.01)
(Continued)

(52) U.S. Cl.
CPC .......... *H04L 1/1816* (2013.01); *H04L 1/0002* (2013.01); *H04L 1/1845* (2013.01); *H04W 28/0236* (2013.01); *H04W 84/047* (2013.01)

(58) Field of Classification Search
None
See application file for complete search history.

(56) References Cited

U.S. PATENT DOCUMENTS

2008/0031313 A1\* 2/2008 Oksman ................ H04L 5/0044
375/222
2009/0109907 A1\* 4/2009 Tsai ...................... H04L 5/0037
370/329
(Continued)

FOREIGN PATENT DOCUMENTS

CN         107302415 A      10/2017
EP         1583270 A1       10/2005
WO     WO-2017192070 A1 \*  11/2017    .......... H04J 13/0044

OTHER PUBLICATIONS

International Search Report and the Written Opinion of the International Searching Authority, issued in corresponding International Application No. PCT/SE2019/050650, dated Apr. 28, 2020, 11 pages.

(Continued)

*Primary Examiner* — Benjamin Lamont
(74) *Attorney, Agent, or Firm* — ROTHWELL, FIGG, ERNST & MANBECK, P.C.

(57) ABSTRACT

A first type node ($AP_0$, $AP_1$, $AP_2$) in a wireless communication system (1), wherein the first type node ($AP_0$, $AP_1$, $AP_2$) is adapted to: —communicate with at least one other first type node ($AP_0$, $AP_1$, $AP_2$) in the wireless communication system (1) over a corresponding channel ($h_{A01}$, $h_{A12}$), and —transmit a first plurality of signals ($x_{11}$, $x_{1i}$, $X_{1N}$, $X_{21}$, $X_{2i}$, $X_{2N-1}$) to the other first type node ($AP_0$, $AP_1$, $AP_2$). In the case of the other first type node ($AP_0$, $AP_1$, $AP_2$) requesting re-transmission of a failed signal ($x_{11}$) in the first plurality of signals ($x_{11}$, $x'_{1i}$, $X_{1N}$, $X_{21}$, $X_{2i}$, $X_{2N-1}$), the first type node ($APo$, $AP_1$, $AP_2$) is further adapted to: —receive a limit of tolerable interference from the other first type node (APo, APi, AP2), and —re-send the failed signal (xn) in a second plurality of signals ($x_{11}$, $x'_{2i}$ $x'_{1i}$, $X'_{1N}$, $X'_{21}$, $X'_{2N-1}$, $X'_{2N}$, $X_{2N}$; $X_{11}$, $x'_{2i}$, $x'_{1i}$, $X'_{1N}$, $x'_{21}$, $x'_{2N-1}$, $X_{2N}$) to the other first type node ($AP_0$, $AP_1$, $AP_2$) while sharing the spectrum (Continued)

for the failed signal ($x_{11}$) with an additional signal ($x'_{2i}$) without exceeding the limit of tolerable interference.

18 Claims, 4 Drawing Sheets

(51) Int. Cl.
  *H04L 1/1829* (2023.01)
  *H04W 28/02* (2009.01)
  *H04W 84/04* (2009.01)

(56) References Cited

U.S. PATENT DOCUMENTS

| | | | | |
|---|---|---|---|---|
| 2009/0252051 | A1* | 10/2009 | Yu | H04W 52/367 |
| | | | | 370/252 |
| 2009/0276675 | A1* | 11/2009 | Ojala | H04L 1/1819 |
| | | | | 714/790 |
| 2011/0218002 | A1* | 9/2011 | Hong | H04B 15/00 |
| | | | | 455/501 |
| 2018/0070265 | A1 | 3/2018 | Seo et al. | |
| 2018/0092139 | A1 | 3/2018 | Novlan et al. | |
| 2018/0124684 | A1 | 5/2018 | Kwon et al. | |
| 2019/0149303 | A1 | 5/2019 | Yilmaz et al. | |
| 2020/0092048 | A1* | 3/2020 | Hong | H04L 5/0055 |
| 2021/0321281 | A1* | 10/2021 | Wei | H04B 17/336 |

OTHER PUBLICATIONS

Huawei et al. "Consideration on IAB physical layer enhancement" 3GPP TSG RAN WG1 Meeting #91, R1-1720606, Reno, USA, Nov. 27-Dec. 1, 2017, 7 pages.

AT&T "Summary of 7.7.1 Enhancements to support NR backhaul links" 3GPP TSG RAN WG1 Meeting #93, R1-1807769, Busan, Korea, May 21-25, 2018, 20 pages.

M. Hashemi, M. Coldrey, M. Johansson and S. Petersson, "Integrated Access and Backhaul in Fixed Wireless Access Systems," 2017 IEEE VTC-Fall, Toronto, Canada, 2017, pp. 1-5.

3GPP, "3rd Generation Partnership Project; Technical Specification Group Radio Access Network; Evolved Universal Terrestrial Radio Access (E-UTRA); Physical layer for relaying operation (Release 15)" 3GPP TS 36.216 V15.0.0 (Jun. 2018), 16 pages.

H. A. Willebrand and B. S. Ghuman, "Fiber optics without fiber," IEEE Spectrum, vol. 38, No. 8, pp. 40-45, Aug. 2001.

AT&T "Enhancements to support NR backhaul links" 3GPP TSG RAN WG1 Meeting #95, R1-1812859, Chengdu, China, Oct. 8-12, 2018, 13 pages.

* cited by examiner

RELAYING IN A WIRELESS COMMUNICATION NETWORK

CROSS REFERENCE TO RELATED APPLICATION(S)

This application is a 35 U.S.C. § 371 National Phase Entry Application from PCT/SE2019/050650, filed Jul. 1, 2019, designating the United States, the disclosure of which is incorporated herein by reference in its entirety.

TECHNICAL FIELD

The present disclosure relates to relaying in wireless communication networks, in particular in integrated access and backhaul (IAB) networks.

BACKGROUND

The fifth generation of wireless networks (5G) must provide high-rate data streams for everyone everywhere at any time. To meet such demands, it is required to use large bandwidths. Here, it is mainly concentrated on millimeter wave-based, potentially, massive multiple-input and multiple-output (MMIMO), links as a key enabler to obtain sufficiently large bandwidths/data rates. Importantly, the presence of very wide bandwidths makes it possible to include the wireless backhaul transport in the same spectrum as the wireless access. In such a setup, there is thus a sharing of radio resources between access and backhaul links which implies that access and backhaul links compete over the same radio resources pool.

For this reason, 3GPP has considered such integrated access and backhaul (IAB) network configurations where an access point (AP), that for example can be fiber-connected, provides other APs as well as the customer-premises equipments (CPEs) inside its cell area with wireless backhaul and access connections, respectively. The access-integrated backhaul link can either be a single-hop or multi-hop link in an IAB network. In a multi-hop deployment, the IAB network from one AP is relayed along a certain route from AP to AP until it reaches its destination. IAB networks can thus have either star-like configuration with multiple APs wirelessly backhauled through direct single-hop connections to the fiber-connected AP, or a cascade configuration with APs wirelessly connected to the fiber-connected AP in a multi-hop fashion.

It is desired to densify the network with a large number of access points (AP:s), each one serving a number of CPE:s inside its corresponding relatively small cell area. Compared to the cases with few macro base stations covering a wide area, less path loss/shadowing, and higher Line Of Sight (LOS) connection probability are expected in dense small-cell networks. As a result, better channel quality is experienced in these short-range links, compared to the cases with few macro base stations.

Among the advantageous of IAB networks are the followings:

Cost Reduction:

A fiber optic link is relatively expensive in metropolitan areas, with a majority of the total figure tied to trenching and installation. For this reason, as well as the traffic jams and infrastructure displacements, some cities have considered a moratorium on fiber trenching specially in historical areas. In such scenarios, millimeter wave-based wireless backhaul is the best alternative providing almost the same rate as fiber optic with significantly less price and no digging.

Link Quality Enhancement:

Compared to the direct macro base station (BS)-CPE link, less path loss/shadowing, and higher line-of-sight (LOS) connection probability are expected for the wirelessly backhauled AP-CPE connections within small cells. As a result, better channel quality is experienced in such small cells, compared to the cases with direct macro BS-CPE connection.

Long-Term Network Planning:

IAB systems are of most interest in small cell backhaul and fixed wireless access (FWA) networks with stationary APs/CPEs. This makes it possible to predict the channel quality and perform accurate network planning for multiple packet transmissions.

In an IAB network, aggregated data is accumulated from multiple hops which leads to high load of the backhaul links as well as high end-to-end and/or scheduling delay. Particularly, the AP-AP backhaul links transfer an aggregated data of a large number of CPEs served by, e.g., different APs of the multi-hop network. Due to high load of the AP-AP links, the signals may remain in queue for multiple time slots and be scheduled with large delays which leads to high end-to-end transmission delay, as well as high buffer requirement. For this reason, it has been suggested to limit the number of hops to ≤2. To be able to support a plurality of CPEs/hops in delay-sensitive applications, it is desired to design efficient transmission methods which not only reduce the buffer cost but also exploit the unique properties of the IAB networks to reduce the backhauling load/end-to-end transmission delay.

Generally, there is a desire to have a node in a wireless communication system which communicate with at least one other node, where backhauling load and end-to-end transmission delay are reduced.

SUMMARY

It is an object of the present disclosure to provide a node in a wireless communication system which communicate with at least one other node, where backhauling load and end-to-end transmission delay are reduced.

This object is obtained by means of a first type node in a wireless communication system, where the first type node is adapted to communicate with at least one other first type node in the wireless communication system over a corresponding channel, and to transmit a first plurality of signals to the other first type node. In the case of the other first type node requesting re-transmission of a failed signal in the first plurality of signals, the first type node is further adapted to receive a limit of tolerable interference from the other first type node, and to re-send the failed signal in a second plurality of signals to the other first type node, while sharing the spectrum for the failed signal with an additional signal without exceeding the limit of tolerable interference.

In this manner, the backhauling load and the buffering cost are reduced significantly with no error penalty for the CPE:s. Also, the scheduling delay of the CPE:s is reduced which leads to higher end-to-end throughput. This may give the chance to increase the number of hops and/or CPE:s per hop in multi-hop networks, for example multi-hop IAB networks.

According to some aspects, there is an available spectral resource accomplished by means of the sharing of the spectrum, where the first type node is adapted to, in the available spectral resource, add a signal that has been delayed queuing.

In this manner, a waiting signal can be included in a following re-sending using available spectral resources.

According to some aspects, there is an available spectral resource accomplished by means of the sharing of the spectrum, where the first type node is adapted to, in the available spectral resource, adapt a transmission rate accordingly for at least one signal.

This improves the reliability of CPE:s, in particular high-rate CPE:s.

According to some aspects, the first type node is adapted to re-encode the decoded signals and to transmit these re-encoded signal to the other first type node with data rates that are adapted to the free spectrum determined to be presently available.

In this manner, the free spectrum is used in an efficient manner.

According to some aspects, the first type node is adapted for access communication with a corresponding group of second type nodes via a corresponding access channel, each group of second type nodes comprising at least one second type node. The communication between the first type nodes is a backhaul communication via at least one corresponding backhaul channel, and where the backhaul communication and the access communication both are performed by means of a common equipment at the first type nodes.

This means that the present disclosure is applicable for JAB networks.

This means that the present disclosure is applicable for JAB networks.

According to some aspects, the first type node is adapted for at least one diversity method including frequency hopping to be applied to hybrid automatic repeat request (HARQ) protocols.

According to some aspects, the first type node is adapted to communicate with said other first type node having Chase combining HARQ using maximum ratio combining (MRC) at its receiver.

In this manner, the use of the spectral resource is enhanced.

According to some aspects, the first type node is adapted to transmit the first plurality of signals to the other first type node in a transmission based on orthogonal multiple access (OMA).

According to some aspects, the first type node is adapted to re-send the failed signal to the other first type node in a transmission based on non-orthogonal multiple access (NOMA).

In this way, free spectrum can be better used and more resources allocated to the CPE:s with high data rates or schedule new CPE(:s) being in the queue. Thus, the buffer requirement is reduced.

This object is also obtained by means of methods and a communication system that are associated with the above advantages.

BRIEF DESCRIPTION OF THE DRAWINGS

The present disclosure will now be described more in detail with reference to the appended drawings, where.

DETAILED DESCRIPTION

Figure 1:
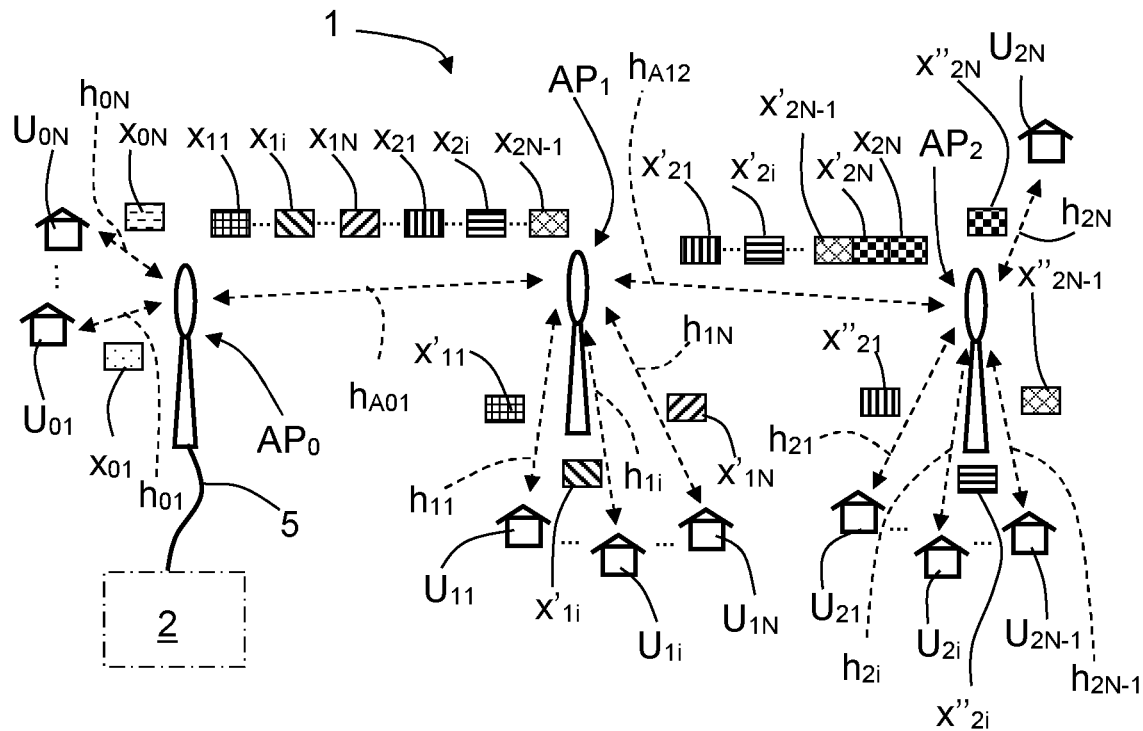
FIG. 1 schematically shows a view of a wireless communication system at a first instant corresponding to a first round.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Network densification takes advantage of wireless backhaul; due to a relatively high installation cost of fiber links, as well as traffic jams and infrastructure displacements, the relatively small application points (APs) need to be supported by high-rate LOS wireless backhaul links which motivates so-called integrated access and backhaul (IAB) networks.

With reference to FIG. 1, there is a wireless communication system 1 comprising an IAB network with two hops. There are first type nodes $AP_0$, $AP_1$, $AP_2$ in the wireless communication system 1, here in the form of a first access point $AP_0$, a second access point $AP_1$ and a third access point $AP_2$. The access points $AP_0$, $AP_1$, $AP_2$ are arranged for communication with each other in the wireless communication system 1 over a corresponding backhaul channel, $h_{401}$, $h_{412}$ having a certain channel quality, generally by means of one of at least one type of signal relaying that according to some aspects employs decoding and encoding. According to some aspects, the signal relaying is constituted by decoding-encoding forward, DF, relaying of a signal.

Each access point $AP_0$, $AP_1$, $AP_2$ is adapted for access communication with a corresponding group of second type nodes $U_{01}$, $U_{0N}$; $U_{11}$, $U_{1i}$, $U_{1N}$; $U_{21}$, $U_{2i}$, $U_{2N-1}$, $U_{2N}$ via a corresponding access channel $h_{01}$, $h_{0N}$; $h_{11}$, $h_{1i}$, $h_{1N}$; $h_{21}$, $h_{2i}$, $h_{2N-1}$, $h_{2N}$, providing wireless access. The second type nodes $U_{01}$, $U_{0N}$; $U_{11}$, $U_{1i}$, $U_{1N}$; $U_{21}$, $U_{2i}$, $U_{2N}$ are here in the form of customer-premises equipments (CPE:s), and generally each group of CPE:s $U_{01}$, $U_{0N}$; $U_{11}$, $U_{1i}$, $U_{1N}$; $U_{21}$, $U_{2i}$, $U_{2N}$ comprises at least one CPE. In FIG. 1, there is a generalized nomenclature where an integer N of CPE:s, channels and signals is depicted, where the number N can be different for different access points $AP_0$, $AP_1$, $AP_2$ and different channels. For example, for the third access point $AP_2$ there are CPE:s $U_{21}$, $U_{2i}$, $U_{2N}$, where i is any number between 1 and N. In this manner, a general nomenclature is used, although in the example there are three CPE:s. Generally, the number N is at least one.

The communication between the access points $AP_0$, $AP_1$, $AP_2$ is a backhaul communication via a corresponding backhaul channel $h_{401}$, $h_{412}$, and in the IAB network, the backhaul communication and the access communication are both performed by means of a common equipment at the access points $AP_0$, $AP_1$, $AP_2$. The second access point $AP_1$ and the third access point $AP_2$ are wirelessly backhauled by the first access point $AP_0$ connecting to a core network 2 using a fiber connection 5.

In IAB networks, uplink (UL) and downlink (DL) transmission do not follow the common definition, as both endpoints of the backhaul links are access points. However, for simplicity, we refer to data transmission towards (resp. from) the first access point $AP_0$ as UL (resp. DL) transmission.

Considering FIG. 1 the discussions relate to UL transmission from the CPEs $U_2i$, $\forall i$, served by the third access point $AP_2$, to the first access point $AP_0$. However, the same discussions can be applied for DL transmission as well. Also, we present the setup for time-division multiple access (TDMA) setup. However, the same scheme can also be adapted for other resource allocation approaches such as for example frequency-division multiple access (FDMA) and code-division multiple access (CDMA).

As the number of hops/CPEs per hop increases, the APs need to transfer an aggregated data of multiple CPEs accumulated from the previous hops. As a result, the AP-AP backhaul links are heavily loaded, which may lead to high decoding complexity/delay and buffering cost for the APs as well as large end-to-end transmission delay/low end-to-end throughput for the CPEs. Generally, the CPEs associated with $AP_j$ are denoted by $U_{jn}$, $n=1, \ldots, N$ where N is the number of CPE:s allocated for each AP. Also, the signal of $U_{jn}$ is represented by $x_{jn}$, $\forall i$, n. The following example will be directed towards UL transmission in the $AP_2$-$AP_1$-$AP_0$ route with special attention to the link $AP_1$-$AP_0$ between the second access point $AP_1$ and the first access point $AP_0$ transferring the accumulated data of CPE:s $U_{jn}$, j=1, 2, n=1, ..., N to the first access point $AP_0$. According to some aspects, in this example so-called Chase combining (Type II) HARQ (hybrid automatic repeat request) can be used where the same signal is sent in successive retransmission rounds and the receiver performs maximum ratio combining (MRC) to decode the signal based on the accumulated copies of the signal. However, the present disclosure is applicable for any suitable HARQ protocol. Also, a setup for the least complicated case with two hops and two retransmissions will be discussed in order to convey an understanding of the present disclosure although the present disclosure can be extended to an arbitrary number of hops/retransmissions. According to some aspects, in the present context, a signal corresponds to a data signal or a data message.

In the following, a first example will be described with reference to FIG. 1 and FIG. 2.

As illustrated in FIG. 1, showing a first instant corresponding to a first round, the second access point $AP_1$ is adapted to communicate the first access point $AP_0$ over a first backhaul channel $h_{A01}$, and to transmit a first plurality of signals $x_{11}, x_{1i}, x_{1N}, x_{21}, x_{2i}, x_{2N-1}$ to the first access point $AP_0$. In this example, there is a failed signal xi in the first plurality of signals $x_{11}, x_{1i}, x_{1N}, x_{21}, x_{2i}, x_{2N-1}$, and the first access point $AP_0$ then requests re-transmission of the failed signal $x_{11}$.

The second access point $AP_1$ is then adapted to receive a limit of tolerable interference from the first access point $AP_0$. As illustrated in FIG. 2, showing a second instant corresponding to a second round and following the first instant, the second access point $AP_1$ is further adapted to re-send the failed signal xi in a second plurality of signals $x_{11}, x'_{2i}, x'_{11}, x'_{1i}, x'_{1N}, x'_{21}, x'_{2N-1}, x'_{2N}, x_{2N}$ to the first access point $AP_0$.

In this context it is mentioned that, for the sake of completeness in FIG. 1, the CPE:s $U_{11}, U_{1i}, U_{1N}$ served by the second access point $AP_1$ are transmitting signals $x'_{11}$, $x'_{1i}, x'_{1N}$, that are going to be comprised in the second plurality of signals, to the second access point $AP_1$.

Furthermore, the CPE:s $U_{21}, U_{2i}, U_{2N}$ served by the third access point $AP_2$ are transmitting signals $x''_{21}, x''_{2i}, x''_{2N-1}, x''_{2N}$, that are going to be in at least one future round and are shown for the sake of completeness.

Figure 2:
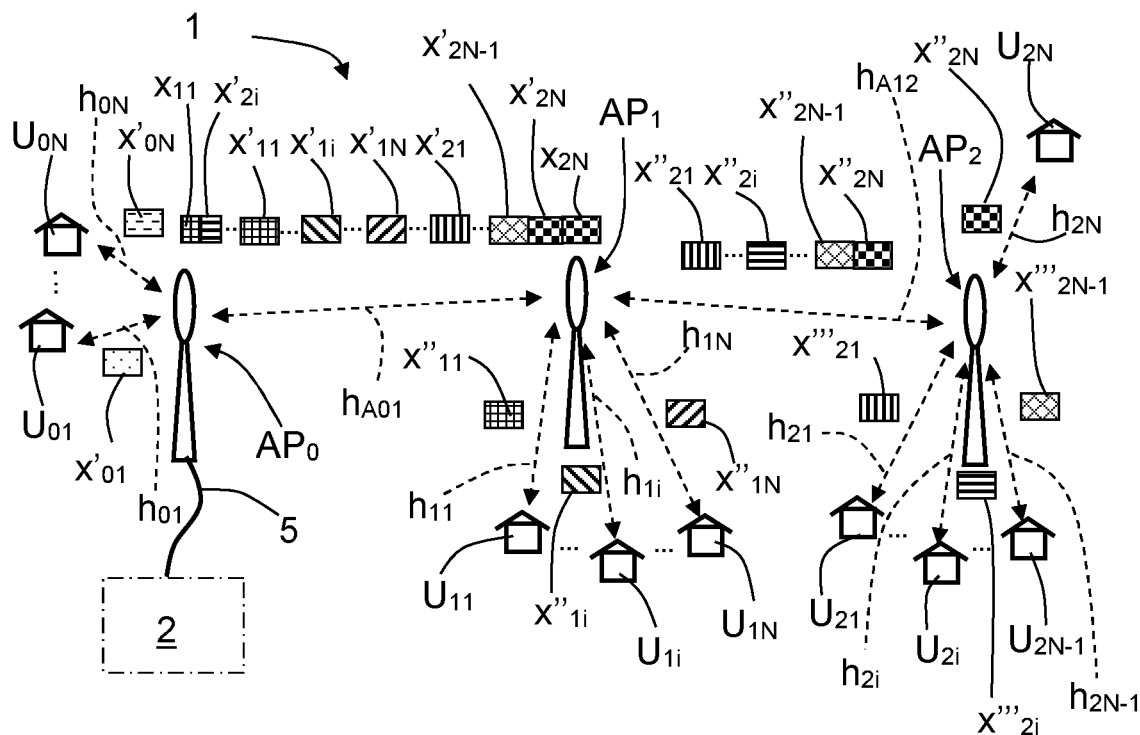
FIG. 2 schematically shows a first example of a view of a wireless communication system at a second instant corresponding to a second round, following the first instant.

In FIG. 2, the CPE:s $U_{11}, U_{1i}, U_{1N}$ served by the second access point $AP_1$ are transmitting signals $x''_{11}, x''_{1i}, x''_{1N}$ to the second access point $AP_1$. Furthermore, the CPE:s $U_{21}, U_{2i}, U_{2N}$ served by the third access point $AP_2$ are transmitting signals $x'''_{21}, x'''_{2i}, x'''_{2N-1}, x'''_{2N}$. These signals are going to be in at least one future round and are shown for the sake of completeness.

According to the present disclosure, when this occurs, the spectrum for the failed signal xi is shared with an additional signal $x'_{2i}$ without exceeding the limit of tolerable interference. This will be described more in detail below.

In a wireless communication system 1 as described, for example an IAB network with small cell backhaul and fixed wireless access (FWA) networks, with stationary AP:s/CPE:s, the AP-AP links are static channels where the channel quality remains constant for a long time. Therefore, the transmission parameters, e.g., rate and power, can be set with high accuracy such that the data is successfully transmitted with the maximum achievable rate of the link and a low probability of requiring retransmissions. In this way, with proper parameter adaptation, if a signal is not correctly decoded by an AP, for instance if there is short-term blockage or changes in the fading, the received signal-to-noise ratio (SNR) is only slightly less than the SNR required for successful signal decoding.

Figure 3:
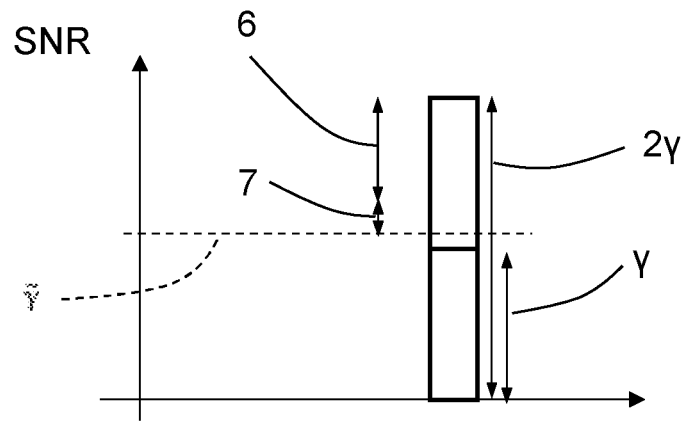
FIG. 3 schematically shows a graphical representation of accumulated SNR for two instants corresponding to two rounds.

With reference to FIG. 3, denoting the received SNR in the first round by $\gamma$ and the SNR required for successful signal decoding by $\tilde{\gamma}$, $\gamma \leq \tilde{\gamma}$ if an AP fails to decode the signal correctly, in other words the received SNR in the first round $\gamma$ is slightly less than the SNR required for successful signal decoding $\tilde{\gamma}$, which results in the failed signal $x_{11}$. The SNR required for successful signal decoding $\tilde{\gamma}$ can be assumed to be fixed, since the backhaul channel also can be assumed to be fixed. According to some aspects, with for example Chase combining HARQ-based retransmission and MRC at the receiver, the accumulated SNR at the end of the second round is given by $2\gamma$ (in general, $n\gamma$ after n retransmissions) which, depending on the channel conditions, may be considerably larger than the SNR required for successful signal decoding, i.e., $\gamma \leq \tilde{\gamma} \ll 2\gamma$. That is, by HARQ-based retransmission, the AP-AP link is over-protected, and the AP is provided with the SNR much more than required for successful signal decoding. Thus, it can tolerate some interference as long as the additive interference power does not deteriorate the successful signal decoding probability of the CPE using retransmissions.

This means that in accordance with the present disclosure, in the second round, as well as in other possible retransmission rounds, an extra SNR gap 6 is obtained from the accumulated SNR at the end of the second round $2\gamma$ with the deduction of the SNR required for successful signal decoding $\tilde{\gamma}$ and a safety margin SNR 7. The extra SNR gap 6 is used by another CPE such that, while the spectrum is shared by different CPE:s, their successful signal decoding is guaranteed.

According to some aspects, a successive interference cancellation (SIC) scheme is used such that the signal of the paired CPE(:s) are decoded interference-free. Then, the available spectrum which has become free, according to some aspects due to non-orthogonal multiple access (NOMA)-based transmission, is utilized to improve the data transmission condition of other CPE:s or to schedule the CPE:s being in the queue.

With static channels, the transmission parameters, e.g., rate and power, are set with high accuracy such that the signals, the data, is transferred with the maximum achievable rate and a low probability of requiring retransmissions. Thus, if the receiving first access point $AP_0$ fails to decode a signal, the received SNR is only slightly less than the SNR required for successful signal decoding. On the other hand, with HARQ-based retransmissions the SNR accumulated after multiple retransmissions exceeds much more than the minimum SNR required for successful signal decoding. Thus, the receiver can tolerate some interference and allow another signal to be transferred in the same spectrum resource, as long as the added interference power is less than maximum tolerable SNR loss.

With the channels being assumed to be static, the transmission parameters, e.g., rate and power, are set with high accuracy such that the data is transferred with the maximum achievable rate and a low probability of requiring retransmissions. Thus, if the receiving first access point $AP_0$, fails to decode a signal $x_{11}$, the received SNR $\gamma$ is only slightly less than the SNR $\tilde{\gamma}$ required for successful signal decoding. On the other hand, with HARQ-based retransmissions, the SNR $2\gamma$ accumulated after multiple retransmissions exceeds much more than the minimum SNR required for successful signal decoding. Thus, the receiving first access point $AP_0$ can tolerate some interference and allow another signal to be transferred in the same spectrum resource, as long as the added interference power is less than maximum tolerable SNR loss. Although the above applies to MRC-based HARQ, the same concept is valid for other HARQ methods Depending on the CPEs' message decoding status, an AP, in this example the second access point $AP_1$, can use different multiple access schemes for data transmission. In the first round shown in FIG. 1, the messages are transferred in orthogonal resources. If an AP, in this example the first access point $AP_0$, fails to decode the signal of an CPE, in this example the failed signal $x_{11}$, it sends a negative acknowledgement (NACK) signal as well as the possible limit of the tolerable interference to the second access point $AP_1$. Then, based on this information, in the second round, the first access point $AP_1$ may share the spectrum of the failed signal $U_{11}$ with another CPE, in this example a shared signal $x'_{2i}$ from a corresponding CPE $U_{2i}$.

Particularly, the retransmission of the failed signal xi is superimposed with the shared signal $x'_{2i}$ and sent to the first access point $AP_0$, according to some aspects in NOMA-based fashion. Also, the parameters are set such that successful decoding of these signals $x_{11}$, $x'_{2i}$ is guaranteed. According to some aspects, at the first access point $AP_0$, a successive interference cancellation (SIC)-based receiver is utilized to first decode the failed signal xi based on the two interference-free and interference-affected copies of its signal. Then, removing the decoded message the failed signal $x_{11}$, the first access point $AP_0$ decodes the shared signal $x'_{2i}$ interference-free.

In this way, instead of over-protecting the AP-AP link, the available spectrum is effectively used to reduce the load of the backhaul link. Finally, a spectral resource has become free due to sending the shared signal $x'_{2i}$ in the spectrum resource of a first CPE $U_{11}$ that is associated with the failed signal $x_{11}$, and according to some aspects, this spectral resource can be used for handling signals in different ways; two examples are given below.

According to some aspects, in FIG. 1 there is a delayed signal $x_{2N}$, associated with a delayed CPE $U_{2N}$ and belonging to the first round, which has been held in a queue between the second access point $AP_1$ and the third access point $AP_2$. As shown in FIG. 2, the available spectral resource is used for adding the delayed signal $x_{2N}$ in the second round, together with a corresponding signal $x'_{2N}$ belonging to the second round, having been transferred from the third access point $AP_2$ together with the delayed signal $x_{2N}$. This can reduce the scheduling delay of the CPE:s in the queue. here the delayed CPE $U_{2N}$.

According to some aspects, the available spectral resource is used to adapt a transmission rate accordingly for at least one signal.

Figure 4:
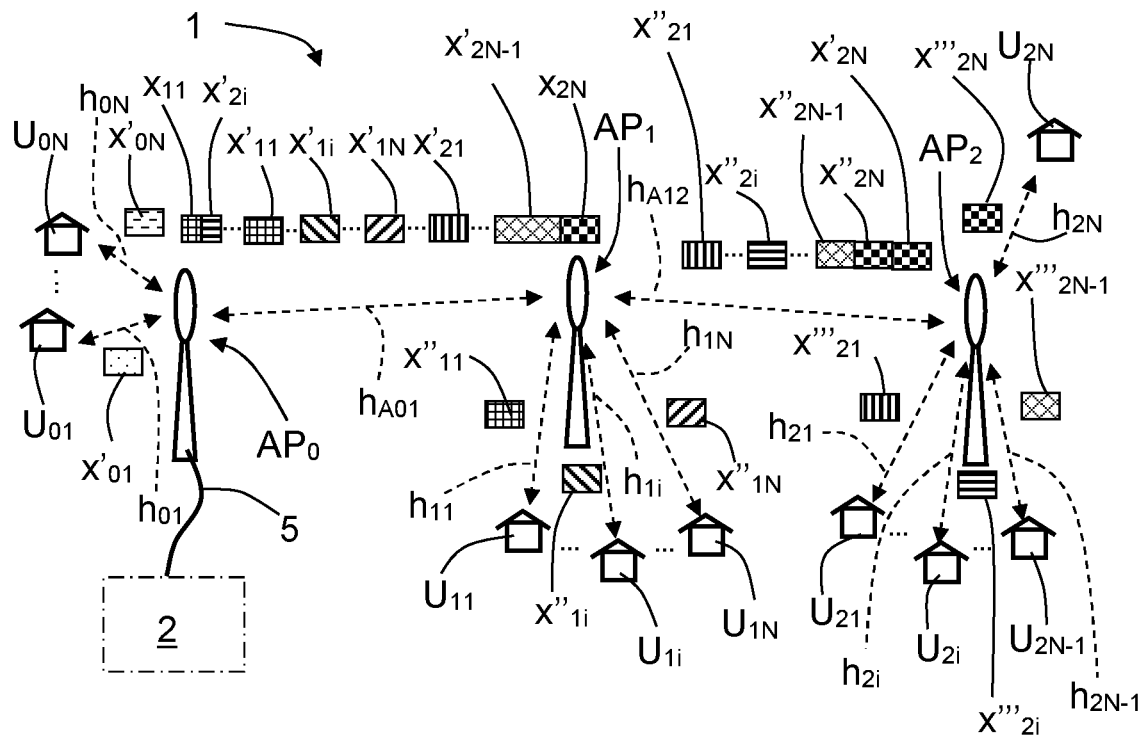
FIG. 4 schematically shows a second example of a view of a wireless communication system at a second instant corresponding to a second round, following the first instant.

In a second example, with reference to FIG. 1 and FIG. 4, there is a delayed signal $x_{2N}$ belonging to the first round that has been held in a queue, and the delayed signal $x_{2N}$ is added in the second round as shown in FIG. 4 at the expense of a following corresponding signal $x'_{2N}$ belonging to the second round but being held in a queue. Here, the available spectral resource is used to adapt the transmission rate accordingly for a further signal $x'_{2N-1}$ associated with another CPE $U_{2N-1}$ that is a high-rate CPE. This improves the reliability of CPE:s, in particular high-rate CPE:s.

More in detail, in FIG. 1, showing a first instant corresponding to a first round, the second access point $AP_1$ is adapted to communicate the first access point $AP_0$ over a first backhaul channel $h_{A01}$, and to transmit a first plurality of signals $x_{11}$, $x_{1i}$, $x_{1N}$, $x_{21}$, $x_{2i}$, $x_{2N-1}$ to the first access point $AP_0$. In the same way as in the first example, there is a failed signal xi in the first plurality of signals $x_{11}$, $x_{1i}$, $x_{1N}$, $x_{21}$, $x_{2i}$, $x_{2N-1}$, and the first access point $AP_0$ then requests re-transmission of the failed signal $x_{11}$.

The second access point $AP_1$ is then adapted to receive a limit of tolerable interference from the first access point $AP_0$. As illustrated in FIG. 4, showing a second instant corresponding to a second round and following the first instant, the second access point $AP_1$ is further adapted to re-send the failed signal $x_{11}$ in a second plurality of signals $x_{11}$, $x'_{2i}$, $x'_{1i}$, $x'_{1N}$, $x'_{21}$, $x'_{2N-1}$, $x_{2N}$ to the first access point $AP_0$ while sharing the spectrum for the failed signal $x_{11}$ with an additional signal $x'_{2i}$ without exceeding the limit of tolerable interference. As mentioned above, a signal $x'_{2N}$ belonging to the second round is held in a queue, while the available spectral resource is used to adapt the transmission rate accordingly for a further signal $x'_{2N-1}$ associated with another CPE $U_{2N-1}$ that here is a high-rate CPE.

In FIG. 4, the CPE:s $U_{11}$, $U_{1i}$, $U_{1N}$ served by the second access point $AP_1$ are transmitting signals $x''_{11}$, $x''_{1i}$, $x''_{1N}$ to the second access point $AP_1$. Furthermore, the CPE:s $U_{21}$, $U_{2i}$, $U_{2N}$ served by the third access point $AP_2$ are transmitting signals $x'''_{21}$, $x'''_{2i}$, $x'''_{2N-1}$, $x'''_{2N}$. These signals are going to be in at least one future round and are shown for the sake of completeness.

In the following, the present disclosure will be described more in detail in a number of steps.

Step 1: In a first round, a first plurality of signals $x_{11}$, $x_{1i}$, $x_{1N}$, $x_{21}$, $x_{2i}$, $x_{2N-1}$ are transferred from the second access point $AP_1$ to the first access point $AP_0$ in an orthogonal multiple access (OMA)-based scheme. Also, the first access point $AP_0$ uses a typical OMA-based receiver to decode the messages.

Step 2: If the first access point $AP_0$ fails to correctly decode a signal of a CPE, a failed signal $x_{11}$, it compares the received SNR $\gamma$ with the SNR $\tilde{\gamma}$ required for successful signal decoding and finds out the maximum interference power that it can tolerate in a following retransmission round. Then, the first access point $AP_0$ sends a negative acknowledgement (NACK) signal along with a signal indicating the maximum tolerable interference power 6 to the second access point $AP_1$ preferably there is safe SNR zone 7 to guarantee that the failed signal $x_{11}$ can be correctly decoded in the retransmissions.

Step 3: Receiving these information, the second access point $AP_1$ first uses the CPE:s' data rates to find the CPE:s whose successful message decoding probability can be guaranteed, according to some aspects with NOMA-based transmission, and the available interfering power. In the following, a channel gain of the $AP_1$-$AP_0$ link between the second access point $AP_1$ and the first access point $AP_0$ is represented by g and the additive noise power of the first access point $AP_0$ is normalized to 1. The transmission power considered by the second access point $AP_1$ for transmission of $x_{ij}$ is represented by $P_{ij}$ where $P_{ij} \leq P$, with P being the maximum output power of the second access point $AP_1$. Then, in the first round 1, the received SNR $\gamma$=Pg and with two CPE:s sharing the same spectrum in the second round, the accumulated SNR for the failed signal $x_{11}$ is given by $$\tilde{\gamma}_{11} = Pg + \frac{P_{11}g}{1 + \hat{P}g}, \quad (1)$$

with $P_{11} + \hat{P} = P$ where $P_{11}$ is the power allocated to the message the failed signal $x_{11}$ in the second round, and $\hat{P}$ is the power of the interfering signal. Then, to guarantee successful message decoding of $U_{11}$, $$Pg + \frac{P_{11}g}{1 + \hat{P}g} \geq \tilde{\gamma} + \theta \quad (2)$$

where $\theta \geq 0$ is a threshold denoted by the safe zone 7 in FIG. 3, considered by the network designer for guaranteeing the successful message decoding of the failed signal $x_{11}$. Using equation (2) and $P_{11} + \hat{P} = P$, the transmission power for the retransmission of the failed signal $x_{11}$ is given by $$P_1 = \frac{c(1 + gP)}{g(1 + c)}, c = \tilde{\gamma} + \theta - Pg, \quad (3)$$

and the power available for data transmission of the other sharing CPE is obtained as $$\hat{P} = \frac{gP - c}{g(1 + c)}. \quad (4)$$

Then, the second access point $AP_1$ finds the CPE with the maximum data rate that can be supported by the available transmission power. That is, the second access point $AP_1$ finds the CPE:s such that $$\log(1 + \hat{P}g) \geq r_{ji} \quad (5)$$

where $r_{ji}$ is the data rate of $U_{ji}$ and $\hat{P}$ is the available power found in equation (4). Here, equation (5) is based on the fact that the message of the interfering CPE is decoded at the first access point $AP_0$ by a SIC-based receiver. Then the second access point $AP_1$ selects the CPE with the highest data rate such that equation (5) is satisfied. In this example, it is assumed that this CPE is a selected CPE $U_{2i}$ that in this example is a second CPE $U_{2i}$.

Step 4: The second access point $AP_1$ allocates powers $P_{11}$ and $\hat{P}$ to the retransmission of the failed signal $x_{11}$ and the shared signal $x_{2i}$ of the second CPE $U_{2i}$, respectively, superimposes their signals and sends a combined signal $x_{11} + x_{2i}$ to the first access point $AP_0$ in the spectrum resource which was initially allocated to the failed signal $x_{11}$ in the first round. Then, the spectrum resource which was previously allocated to the shared signal $x_{2i}$ in the first round is now free and is used by the second access point $AP_1$ to adapt the transmission parameter of another, possibly high-rate, CPE, denoted by $x_{2N-1}$ in FIG. 4, or schedule a new CPE, denoted by $x_{2N}$ in FIG. 2, which has been in queue.

Step 5: At the first access point $AP_0$, the decoding scheme is adapted, and a SIC-based receiver is used to decode the signals of the CPE:s $U_{11}$, $U_{2i}$. First, an MRC-based receiver is used to combine the two interference-free (received in the first round) and interference-affected (received in the second round) copies of the failed signal $x_{11}$. Due to power allocation based on equation (3)-(4), the first access point $AP_0$ can correctly decode the failed signal $x_{11}$ in the second round with very high probability. Then, removing the decoded failed signal $x_{11}$ from the received signal, the first access point $AP_0$ decodes the shared signal $x_{2i}$ of the second CPE $U_{2i}$ interference-free which, because of power and rate allocation based on equations (4)-(5), can be correctly decoded with high probability.

Step 6: Based on updated resource allocation of the CPE:s, all AP:s/CPE:s synchronize their signals and determine their timing.

In this way, the present disclosure reduces the load of the backhaul link, improves the transmission reliability for the high-rate CPE:s and reduces the scheduling delay/buffering cost because:

the spectrum is not wasted for over-protecting the AP-AP links and, instead, is reused to transfer multiple signals on the same spectrum with no error penalty for the CPE:s sharing the same spectrum, and NOMA-based transmission gives the chance to use the free spectrum and allocate more resources to the CPE:s with high data rates or schedule new CPE(:s) being in the queue. Thus, the buffer requirement is reduced by the proposed method.

Figure 5:
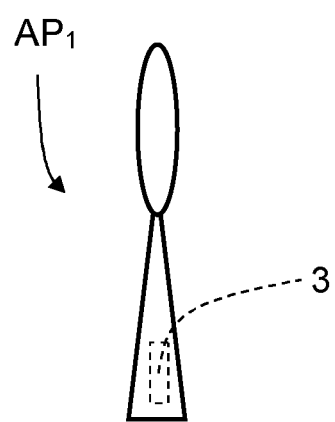
FIG. 5 schematically shows a first type node.

As shown in FIG. 5, according to some aspects, the second access point $AP_1$ comprises a processor unit 3 that is adapted to instruct the second access point $AP_1$ to:

communicate with the first access point $AP_0$ in the wireless communication system 1 over a corresponding channel $h_{A01}$, and to transmit a first plurality of signals $x_{11}$, $x_{1i}$, $x_{1N}$, $x_{21}$, $x_{2i}$, $x_{2N-1}$ to the first access point $AP_0$.

In the case of the first access point $AP_0$ requesting re-transmission of a failed signal xi in the first plurality of signals $x_{11}$, $x_{1i}$, $x_{1N}$, $x_{21}$, $x_{2i}$, $x_{2N-1}$, the processor unit 3 that is further adapted to instruct the second access point $AP_1$ to:

receive a limit of tolerable interference from the first access point $AP_0$, and to re-send the failed signal xi in a second plurality of signals $x_{11}$, $x'_{2i}$, $x'_{1i}$, $x'_{1N}$, $x'_{21}$, $x'_{2N-1}$, $x'_{2N}$, $x_{2N}$; $x_{11}$, $x'_{2i}$, $x'_{1i}$, $x'_{1N}$, $x'_{21}$, $x'_{2N-1}$, $x_{2N}$ to the first access point $AP_0$ while sharing the spectrum for the failed signal $x_{11}$ with an additional signal $x'_{2i}$ without exceeding the limit of tolerable interference.

Figure 6:
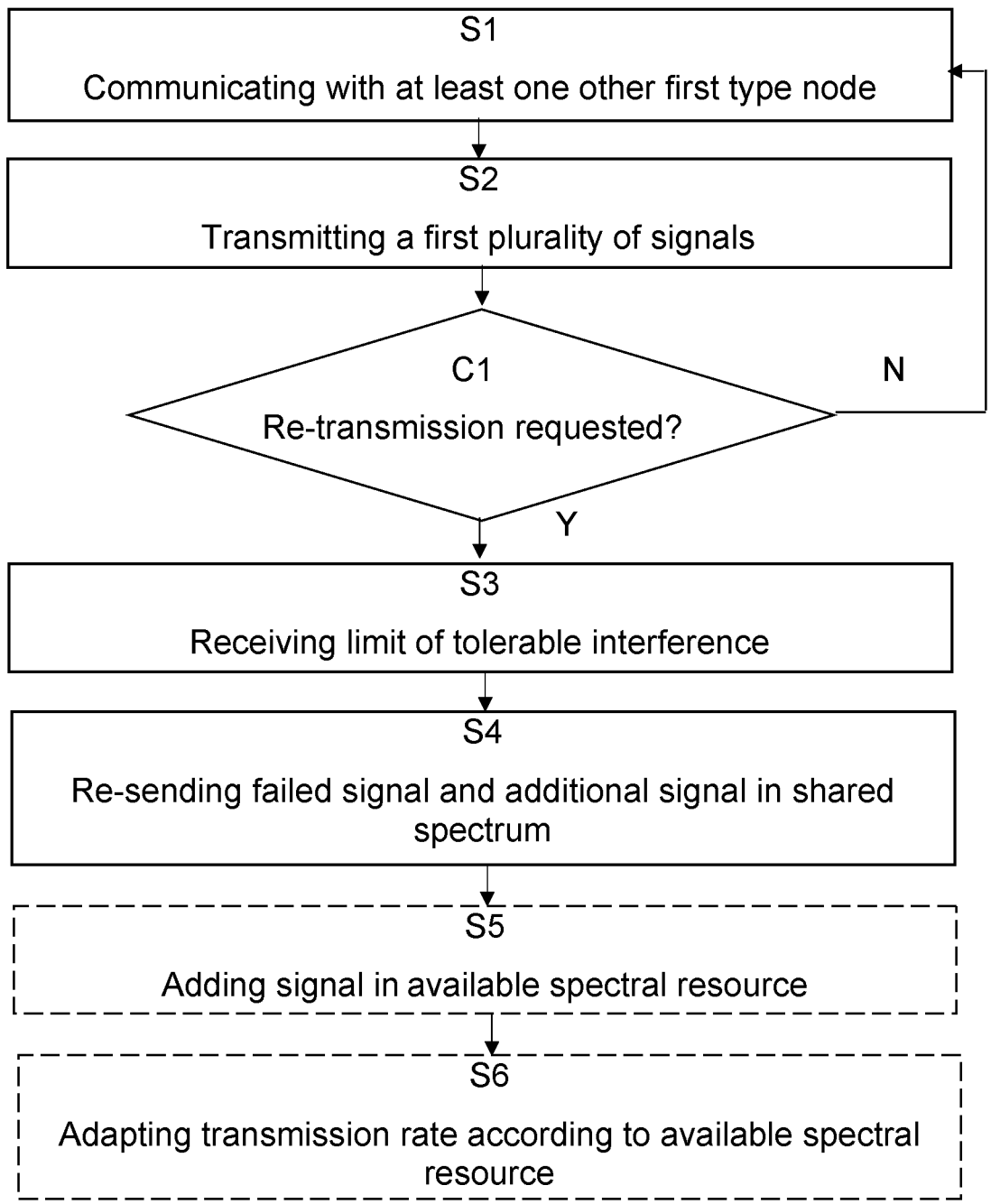
FIG. 6 shows a flowchart of methods according to embodiments.

With reference to FIG. 6, the present disclosure also relates to a method in a first type node $AP_1$ in a wireless communication system 1. The method comprises communicating S1 with at least one other first type node $AP_0$ in the wireless communication system 1 over a corresponding channel $h_{A01}$; and transmitting S2 a first plurality of signals $x_{11}, x_{1i}, x_{1N}, x_{21}, x_{2i}, x_{2N-1}$ to the other first type node $AP_0$.

In the case C1 of the other first type node $AP_0$ requesting re-transmission of a failed signal $x_{11}$ in the first plurality of signals $x_{11}, x_{1i}, x_{1N}, x_{21}, x_{2i}, x_{2N-1}$, the method further comprises receiving S3 a limit of tolerable interference from the other first type node $AP_0$ in case of the other first type node $AP_0$ requesting re-transmission of a failed signal $x_{11}$ in the first plurality of signals $x_{11}, x_{1i}, x_{1N}, x_{21}, x_{2i}, x_{2N-1}$; and re-sending S4 the failed signal $x_{11}$ in a second plurality of signals $x_{11}, x'_{2i}, x'_{1i}, x'_{1N}, x'_{21}, x'_{2N-1}, x'_{2N}, x_{2N}; x_{11}, x'_{2i}, x'_{1i}, x'_{1N}, x'_{21}, x'_{2N-1}, x_{2N}$ to the other first type node $AP_0$ while sharing the spectrum for the failed signal $x_{11}$ with an additional signal $x'_{2i}$ without exceeding the limit of tolerable interference.

According to some aspects, there is an available spectral resource accomplished by means of the sharing of the spectrum, where the method comprises, in the available spectral resource, adding S5 a signal $x_N$ that has been delayed queuing.

According to some aspects, there is an available spectral resource accomplished by means of the sharing of the spectrum, where the method comprises, in the available spectral resource, adapting S6 a transmission rate accordingly for at least one signal $x'_{2N-1}$.

According to some aspects, the method comprises re-encoding the decoded signals and transmitting these re-encoded signal to the other first type node $AP_0$ with data rates that are adapted to the free spectrum determined to be presently available.

According to some aspects, the first type node $AP_1$ is used for access communication with a corresponding group of second type nodes $U_{01}, U_{0N}; U_{11}, U_{1i}, U_{1N}; U_{21}, U_{2i}, U_{2N}$ via a corresponding access channel $h_{01}, h_{0N}; h_{11}, h_{1i}, h_{1N}; h_{21}, h_{2i}, h_{2N}$, each group of second type nodes $U_{01}, U_{0N}; U_{11}, U_{1i}, U_{1N}; U_{21}, U_{2i}, U_{2N}$ comprising at least one second type node $U_{01}, U_{0N}; U_{11}, U_{1i}, U_{1N}; U_{21}, U_{2i}, U_{2N}$, where the communication between the first type nodes $AP_0, AP_1, AP_2$ is a backhaul communication via at least one corresponding backhaul channel $h_{A01}, h_{A12}$, and where the backhaul communication and the access communication both are performed by means of a common equipment at the first type nodes $AP_0, AP_1, AP_2$.

According to some aspects, the first type node $AP_1$ is used for at least one diversity method including frequency hopping to be applied to hybrid automatic repeat request, HARQ, protocols.

According to some aspects, the method comprises communicating with said other first type node $AP_0$ having Chase combining HARQ using maximum ratio combining, MRC, at its receiver.

According to some aspects, the method comprises transmitting the first plurality of signals $x_{11}, x_{1i}, x_{1N}, x_{21}, x_{2i}, x_{2N-1}$ to the other first type node $AP_0$ in a transmission based on orthogonal multiple access, OMA.

According to some aspects, the method comprises re-sending the failed signal xi to the other first type node $AP_0$ in a transmission based on non-orthogonal multiple access, NOMA.

The present disclosure is not limited to the above, but may vary freely within the scope of the appended claims. For example, the present disclosure has been described for the least complicated cases with two hops, two CPE:s sharing the same spectrum and two retransmissions rounds. However, the same discussions can be applied to the cases with arbitrary number of hops, sharing CPE:s and retransmission rounds. Particularly, the efficiency of the proposed scheme increases with the number of retransmissions. This is because the tolerable interference power increases with the number of retransmission rounds which makes it possible to pair multiple CPE:s.

In the examples described with reference to FIG. 3 and FIG. 4, none of the spectrum-sharing CPE:s lose their performance. This is because:

1) the power terms are allocated such that successful message decoding of the first CPE $U_{11}$ is guaranteed and, 2) with SIC-based receiver, the signal of the second CPE $U_{2i}$ is decoded interference-free.

The present disclosure is applicable for both frequency division duplex (FDD) and time division duplex (TDD) schemes, different HARQ protocols as well as for both uplink (UL) and downlink (DL) transmission.

According to some aspects, the present disclosure can easily extended to the cases with arbitrary number of hops, different relaying approaches or star-like network configuration.

The efficiency depends a lot on the availability of the channel state information (CSI) and the predictability of the channel condition such that the transmission parameters can be properly set with no error penalty for the paired CPE:s. This information can be provided in IAB networks due to the stationary network configuration and the static channels conditions.

Sometimes, to increase the successful message decoding probability, different diversity methods such as frequency hopping are applied to HARQ protocols. The present disclosure is well applicable to these techniques as long as the channels quality are known by the AP:s.

The present disclosure has according to an example been described with Chase combining HARQ using MRC at the receiver. However, the present disclosure is applicable for many different types of receiver configurations, e.g., incremental redundancy (Type III), HARQ protocols. Finally, the same discussions can be extended for the cases with different multiplexing schemes as well as for DL transmission.

The present disclosure relates to an efficient data transmission technique that according to some aspects is suitable for multi-hop IAB networks using hybrid automatic repeat request (HARQ). The objective is to reduce the backhauling load of the AP-AP links transferring an aggregated data of multiple CPE:s as well as to reduce the buffering cost. Depending on the CPE:s' data rates, the AP:s may use the same spectrum to transfer the messages of different CPE:s in the HARQ-based retransmission rounds. According to some aspects, if an AP fails to decode the message of a CPE, in the next retransmission round(s) its allocated spectrum may be shared by another CPE in non-orthogonal multiple access (NOMA)-based fashion and the message decoding approach is adapted correspondingly. In this way, the spectrum is not wasted for over-protecting the AP-AP links and, instead, is used to reduce the load of the backhaul links with no penalty for the sharing CPEs. Also, the NOMA-based data transmission gives the chance to allocate the free spectrum to other CPEs, reducing the scheduling delay/buffer requirement.

Above, a case has been described where a SIC-based receiver has been used to first decode one of the signals and then decode the second signal interference-free. According to some aspects, another option is that SIC is not used; instead, a normal receiver is used and the signals are decoded in the presence of interferences. This alternative supports less data rates, but the receiver is less complex.

Other alternatives are of course conceivable, only a few examples having been provided here.

Using a NOMA-based transmission in the retransmission rounds along with the proposed resource reallocation scheme and decoder adaptation method reduces the backhauling load and the buffering cost significantly with no error penalty for the CPE:s. Also, the scheduling delay of the CPE:s is reduced which leads to higher end-to-end throughput. This may give the chance to increase the number of hops and/or CPE:s per hop in multi-hop IAB networks.

In FIG. 1, FIG. 2 and FIG. 4 it is illustrated that the CPE:s $U_{01}$, $U_{0N}$ served by the first access point $AP_0$ are transmitting signals $x_{01}$, $x_{0N}$, $x'_{01}$, $x'_{0N}$, in the rounds described only to illustrate that the first access point $AP_0$ at the same time also can serve a plurality of CPE:s $U_{01}$, $U_{0N}$.

The present disclosure can be applied for any type of transmission between any first type nodes $AP_0$, $AP_1$, $AP_2$ in the wireless communication system 1. Using Chase combining HARQ-based retransmission and MRC is only an example.

Generally, the present disclosure relates to a first type node $AP_1$ in a wireless communication system 1, wherein the first type node $AP_1$ is adapted to:
communicate with at least one other first type node $AP_0$ in the wireless communication system 1 over a corresponding channel $h_{A01}$, and
transmit a first plurality of signals $x_{11}$, $x_{1i}$, $x_{1N}$, $x_{21}$, $x_{2i}$, $x_{2N-1}$ to the other first type node $AP_0$.

In the case of the other first type node $AP_0$ requesting re-transmission of a failed signal xi in the first plurality of signals $x_{11}$, $x_{1i}$, $x_{1N}$, $x_{21}$, $x_{2i}$, $x_{2N-1}$, the first type node $AP_1$ is further adapted to:
receive a limit of tolerable interference from the other first type node $AP_0$, and
re-send the failed signal $x_{11}$ in a second plurality of signals $x_{11}$, $x'_{2i}$, $x'_{1i}$, $x'_{1N}$, $x'_{21}$, $x'_{2N-1}$, $x'_{2N}$, $x_{2N}$; $x_{11}$, $x'_{2i}$, $x'_{1i}$, $x'_{1N}$, $x'_{21}$, $x'_{2N-1}$, $x_{2N}$ to the other first type node $AP_0$ while sharing the spectrum for the failed signal xi with an additional signal $x'_{2i}$ without exceeding the limit of tolerable interference.

According to some aspects, there is an available spectral resource accomplished by means of the sharing of the spectrum, where the first type node $AP_1$ is adapted to, in the available spectral resource, add a signal $x_N$ that has been delayed queuing.

According to some aspects, there is an available spectral resource accomplished by means of the sharing of the spectrum, where the first type node $AP_1$ is adapted to, in the available spectral resource, adapt a transmission rate accordingly for at least one signal $x'_{2N-1}$.

According to some aspects, the first type node $AP_1$ is adapted to re-encode the decoded signals and to transmit these re-encoded signal to the other first type node $AP_0$ with data rates that are adapted to the free spectrum determined to be presently available.

According to some aspects, the first type node $AP_1$ is adapted for access communication with a corresponding group of second type nodes $U_{01}$, $U_{0N}$; $U_{11}$, $U_{1i}$, $U_{1N}$; $U_{21}$, $U_{2i}$, $U_{2N}$ via a corresponding access channel $h_{01}$, $h_{0N}$; $h_{11}$, $h_{1i}$, $h_{1N}$; $h_{21}$, $h_{2i}$, $h_{2N}$, each group of second type nodes $U_{01}$, $U_{0N}$; $U_{11}$, $U_{1i}$, $U_{1N}$; $U_{21}$, $U_{2i}$, $U_{2N}$ comprising at least one second type node $U_{01}$, $U_{0N}$; $U_{11}$, $U_{1i}$, $U_{1N}$; $U_{21}$, $U_{2i}$, $U_{2N}$, where the communication between the first type nodes $AP_0$, $AP_1$, $AP_2$ is a backhaul communication via at least one corresponding backhaul channel $h_{A01}$, $h_{A12}$, and where the backhaul communication and the access communication both are performed by means of a common equipment at the first type nodes $AP_0$, $AP_1$, $AP_2$.

According to some aspects, the first type node $AP_1$ is adapted for at least one diversity method including frequency hopping to be applied to hybrid automatic repeat request, HARQ, protocols.

According to some aspects, the first type node $AP_1$ is adapted to communicate with said other first type node $AP_0$ having Chase combining HARQ using maximum ratio combining, MRC, at its receiver.

According to some aspects, the first type node $AP_1$ is adapted to transmit the first plurality of signals $x_{11}$, $x_{1i}$, $x_{1N}$, $x_{21}$, $x_{2i}$, $x_{2N-1}$ to the other first type node $AP_0$ in a transmission based on orthogonal multiple access, OMA.

According to some aspects, the first type node $AP_1$ is adapted to re-send the failed signal $x_{11}$ to the other first type node $AP_0$ in a transmission based on non-orthogonal multiple access, NOMA. Generally, the present disclosure also relates to a wireless communication system 1 comprising an integrated access and backhaul, IAB, network which in turn at least comprises the first type node $AP_1$ and the other first type node $AP_0$ according to the above.

The invention claimed is:

1. A first type node in a wireless communication system, wherein the first type node is adapted to:
communicate with at least one other first type node in the wireless communication system over a corresponding channel;
transmit a first plurality of signals to the other first type node;
receive a request to re-transmit a failed signal that was included in the first plurality of signals;
receive from the other first type node information indicating a limit of tolerable interference for the failed signal; and
re-transmit to the other first type node a second plurality of signals including the failed signal while sharing the spectrum for the failed signal with an additional signal without exceeding the indicated limit of tolerable interference.

2. The first type node according to claim 1, wherein there is an available spectral resource accomplished by way of the sharing of the spectrum, and the first type node is adapted to, in the available spectral resource, (i) add a signal that has been delayed queuing or (ii) adapt a transmission rate accordingly for at least one signal.

3. The first type node according to claim 2, wherein the first type node is adapted to re-encode decoded signals and to transmit these re-encoded signals to the other first type node with data rates that are adapted to the available spectral resource.

4. The first type node according to claim 1, wherein the first type node is adapted for access communication with a corresponding group of second type nodes via a corresponding access channel,
communication between the first type nodes, which includes the first type node, is a backhaul communication via at least one corresponding backhaul channel,
communication between the first type nodes and the corresponding group of second type nodes is an access communication, and
the backhaul communication and the access communication both are performed by way of a common equipment at the first type nodes.

5. The first type node according to claim 1, wherein the first type node is adapted for at least one diversity method including frequency hopping to be applied to hybrid automatic repeat request, HARQ, protocols.

6. The first type node according to claim 5, wherein the first type node is adapted to communicate with said other first type node having Chase combining HARQ using maximum ratio combining, MRC, at its receiver.

7. The first type node according to claim 1, wherein
the first type node is adapted to transmit the first plurality of signals to the other first type node in a transmission based on orthogonal multiple access, OMA, or
the first type node is adapted to re-send the failed signal to the other first type node in a transmission based on non-orthogonal multiple access, NOMA.

8. The first type node according to claim 1, wherein the information indicating the limit of tolerable interference for the failed signal is determined and transmitted by the other first type node.

9. The first type node according to claim 1, wherein the limit of tolerable interference for the failed signal corresponds to the maximum interference power the other first type node can tolerate in the re-transmission of the failed signal.

10. The first type of node according to claim 1, wherein the limit of tolerable interference for the failed signal is determined based on a comparison of quality of the failed signal received at the other first type node and a required quality.

11. A wireless communication system comprising an integrated access and backhaul, IAB, network which in turn comprises at least the first type node and the other first type node according to claim 1.

12. A method in a first type node in a wireless communication system, the method comprising:
communicating with at least one other first type node in the wireless communication system over a corresponding channel;
transmitting a first plurality of signals to the other first type node;
receiving a request to re-transmit a failed signal that was included in the first plurality of signals;
receiving from the other first type node information indicating a limit of tolerable interference for the failed signal; and
re-transmitting to the other first type node a second plurality of signals including the failed signal while sharing the spectrum for the failed signal with an additional signal without exceeding the indicated limit of tolerable interference.

13. The method according to claim 12, wherein
there is an available spectral resource accomplished by way of the sharing of the spectrum, and
the method comprises, in the available spectral resource, (i) adding a signal that has been delayed queuing or (ii) adapting a transmission rate accordingly for at least one signal.

14. The method according to claim 13, wherein the method comprises re-encoding decoded signals and transmitting these re-encoded signal to the other first type node with data rates that are adapted to the available spectral resource.

15. The method according to claim 12, wherein
the first type node is used for access communication with a corresponding group of second type nodes via a corresponding access channel,
communication between first type nodes, which includes the first type node, is a backhaul communication via at least one corresponding backhaul channel,
communication between the first type nodes and the corresponding group of second type nodes is an access communication, and
the backhaul communication and the access communication both are performed by way of a common equipment at the first type nodes.

16. The method according to claim 12, wherein the first type node is used for at least one diversity method including frequency hopping to be applied to hybrid automatic repeat request, HARQ, protocols.

17. The method according to claim 16, wherein the method comprises communicating with said other first type node having Chase combining HARQ using maximum ratio combining, MRC, at its receiver.

18. The method according to claim 12, wherein
the method comprises transmitting the first plurality of signals to the other first type node in a transmission based on orthogonal multiple access, OMA, or
the method comprises re-sending the failed signal to the other first type node in a transmission based on non-orthogonal multiple access, NOMA.

* * * * *